US009395868B2

(12) United States Patent
Weber et al.

(10) Patent No.: US 9,395,868 B2
(45) Date of Patent: Jul. 19, 2016

(54) GRAPHICAL USER INTERFACE WINDOW SPACING MECHANISMS

(75) Inventors: Arnaud Claude Weber, Saratoga, CA (US); Alex Neely Ainslie, San Francisco, CA (US); Roma Rajni Shah, San Francisco, CA (US); Glen Murphy, Palo Alto, CA (US)

(73) Assignee: GOOGLE INC., Mountain View, CA (US)

( * ) Notice: Subject to any disclaimer, the term of this patent is extended or adjusted under 35 U.S.C. 154(b) by 142 days.

(21) Appl. No.: 13/312,973

(22) Filed: Dec. 6, 2011

(65) Prior Publication Data

US 2013/0145291 A1  Jun. 6, 2013

(51) Int. Cl.
G06F 3/00 (2006.01)
G06F 3/0481 (2013.01)
G06F 3/0488 (2013.01)
G06F 17/30 (2006.01)
G06F 3/01 (2006.01)

(52) U.S. Cl.
CPC .......... *G06F 3/0481* (2013.01); *G06F 3/04883* (2013.01); *G06F 17/30905* (2013.01)

(58) Field of Classification Search
USPC .............. 715/769, 863, 790, 838; 3/769, 863, 3/790, 838
See application file for complete search history.

(56) References Cited

U.S. PATENT DOCUMENTS 7,930,648 B1 * 4/2011 Jaramillo ....................... 715/790
8,342,844 B1 * 1/2013 Evans ............................ 434/98
2006/0026535 A1 * 2/2006 Hotelling et al. ............. 715/863
2006/0041846 A1 * 2/2006 Masselle et al. .............. 715/793
2006/0190838 A1 * 8/2006 Nadamoto .................... 715/781
2007/0070066 A1 * 3/2007 Bakhash ....................... 345/419
2008/0165141 A1 * 7/2008 Christie ........................ 345/173
2008/0189645 A1 * 8/2008 Kapanen et al. ............. 715/777
2008/0282202 A1 * 11/2008 Sunday ......................... 715/863
2009/0256857 A1 * 10/2009 Davidson et al. ............. 345/619
2009/0307623 A1 * 12/2009 Agarawala et al. ........... 715/765
2009/0322695 A1 * 12/2009 Cho et al. ...................... 345/173
2010/0088634 A1    4/2010 Tsuruta et al.
2010/0090971 A1 * 4/2010 Choi ................... G06F 3/04883
                                                              345/173
2010/0138767 A1    6/2010 Wang et al.

(Continued)

FOREIGN PATENT DOCUMENTS

EP          2158951 A2      3/2010
WO     WO-0057281 A1      9/2000

(Continued)

*Primary Examiner* — Toan Vu
(74) *Attorney, Agent, or Firm* — McDermott Will & Emery LLP (57) ABSTRACT

Computer-implemented methods for adjusting a display of multiple web page windows in a web browser are provided. In one aspect, a method includes receiving selections of visible portions of first and second web page windows oriented in an overlaid configuration with first and second touch inputs, and receiving a dragging motion of the touch inputs to alter the visible portion of at least one of the windows. When the dragging motion includes dragging the touch inputs away from one another, the visible portion of the first web page window is increased and the visible portion of the second web page window is decreased, and when the dragging motion includes dragging the touch inputs towards one another, the visible portion of the first web page window is decreased and the visible portion of the second web page window is increased. Systems, graphical user interfaces, and machine-readable media are also provided.

14 Claims, 7 Drawing Sheets

(56) References Cited

U.S. PATENT DOCUMENTS

| | | | |
|---|---|---|---|
| 2010/0185977 A1* | 7/2010 | Ito | 715/790 |
| 2010/0211872 A1* | 8/2010 | Rolston et al. | 715/702 |
| 2010/0283743 A1* | 11/2010 | Coddington | G06F 3/0485 |
| | | | 345/173 |
| 2010/0283750 A1* | 11/2010 | Kang et al. | 345/173 |
| 2011/0035691 A1* | 2/2011 | Kim | 715/765 |
| 2011/0055773 A1* | 3/2011 | Agarawala et al. | 715/863 |
| 2011/0078624 A1* | 3/2011 | Missig et al. | 715/802 |
| 2011/0090155 A1* | 4/2011 | Caskey et al. | 345/173 |
| 2011/0128244 A1 | 6/2011 | Cho et al. | |
| 2011/0187750 A1* | 8/2011 | Ko et al. | 345/661 |
| 2011/0209101 A1* | 8/2011 | Hinckley | G06F 1/1647 |
| | | | 715/863 |
| 2011/0231796 A1* | 9/2011 | Vigil | 715/810 |
| 2012/0113007 A1* | 5/2012 | Koch | G06F 3/0488 |
| | | | 345/168 |
| 2012/0113216 A1* | 5/2012 | Seen et al. | 348/38 |
| 2012/0174028 A1* | 7/2012 | Sirpal et al. | 715/790 |
| 2012/0242692 A1* | 9/2012 | Laubach | 345/629 |
| 2012/0278757 A1* | 11/2012 | Shah et al. | 715/790 |
| 2013/0036382 A1* | 2/2013 | Yuan | G06F 3/0482 |
| | | | 715/815 |
| 2013/0067400 A1* | 3/2013 | Jitkoff | G06F 3/04883 |
| | | | 715/800 |
| 2013/0232445 A1* | 9/2013 | Ording et al. | 715/790 |
| 2014/0071054 A1* | 3/2014 | Koch et al. | 345/168 |
| 2014/0115534 A1* | 4/2014 | Yuan | G06F 3/0482 |
| | | | 715/800 |

FOREIGN PATENT DOCUMENTS

| | | |
|---|---|---|
| WO | WO-2006092464 A1 | 9/2006 |
| WO | WO-2009143076 A2 | 11/2009 |

* cited by examiner

GRAPHICAL USER INTERFACE WINDOW SPACING MECHANISMS

BACKGROUND

1. Field

The present disclosure generally relates to the transmission of data over a network, and more particularly to the use of a computing device to view data communicated over a network.

2. Description of the Related Art

Mobile device web browsers typically have limited screen space with which to display a single web page, let alone multiple web pages. Accordingly, certain mobile device web browsers use a tabbed document interface (TDI) to open multiple tabbed web page windows within a web browser. When a user wants to select one of the tabbed web page windows ("tabs") to view, the tabs can be displayed in a stack, where tabs are overlaid on top of one another like a stack of cards, with a limited top or side amount of each tab being viewable. The user may not, however, be able to identify a tab based on the limited amount of the tab being displayed, making it difficult for the user to choose between multiple tabs.

SUMMARY

According to one embodiment of the present disclosure, a computer-implemented method for adjusting a display of multiple web page windows oriented in an overlaid configuration in a web browser is provided. The method includes receiving a selection of a visible portion of a first web page window in an overlaid configuration with a second web page window with a first touch input, receiving a selection of a visible portion of the second web page window in the overlaid configuration with a second touch input, and receiving a dragging motion of the first touch input and the second touch input to alter the visible portion of at least one of the first and second web page windows in the overlaid configuration. When the dragging motion includes dragging the touch inputs away from one another, the visible portion of the first web page window is increased and the visible portion of the second web page window is decreased, and when the dragging motion includes dragging the touch inputs towards one another, the visible portion of the first web page window is decreased and the visible portion of the second web page window is increased.

According to another embodiment of the present disclosure, a system for adjusting a display of multiple web page windows oriented in an overlaid configuration in a web browser is provided. The system includes a memory that includes a first web page and a second web page, and a processor. The processor is configured to execute instructions to receive a selection of a visible portion of a first web page window displaying the first web page in an overlaid configuration with a second web page window displaying the second web page with a first touch input, receive a selection of a visible portion of the second web page window in the overlaid configuration with a second touch input, and receive a dragging motion of the first touch input and the second touch input to alter the visible portion of at least one of the first and second web page windows in the overlaid configuration. The overlaid configuration includes a plurality of web page windows in a stack. When the dragging motion includes dragging the touch inputs away from one another, the visible portion of the first web page window is increased and the visible portion of the second web page window is decreased, and when the dragging motion includes dragging the touch inputs towards one another, the visible portion of the first web page window is decreased and the visible portion of the second web page window is increased.

According to a further embodiment of the present disclosure, a mobile web browser for adjusting a display of multiple web page windows oriented in an overlaid configuration in a web browser is provided. The mobile web browser includes a stacking interface configured to provide a display of first and second web page windows oriented in an overlaid configuration, wherein a portion of each of the first and second web page windows is visible, and to receive a selection of the visible portion of the first web page window in the overlaid configuration with a first touch input and a selection of the visible portion of the second web page window in the overlaid configuration with a second touch input. When a dragging motion of the first touch input and the second touch input is received visible portions of the first and second web page windows in the overlaid configuration are altered.

According to yet a further embodiment of the present disclosure, a machine-readable storage medium includes machine-readable instructions for causing a processor to execute a method for adjusting a display of multiple web page windows oriented in an overlaid configuration in a web browser is provided. The method includes receiving a selection of a visible portion of a first web page window in a stack configuration with a second web page window with a first touch input, receiving a selection of a visible portion of the second web page window in the stack configuration with a second touch input, and receiving a dragging motion of the first touch input and the second touch input to alter the visible portion of at least one of the first and second web page windows in the stack configuration. When the dragging motion includes dragging the first touch input and the second touch input away from one another along an axis, the visible portion of the first web page window in the stack configuration is increased. When the dragging motion includes dragging the first touch input and the second touch input towards one another along the axis, the visible portion of the first web page window in the stack configuration is decreased.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

In the following detailed description, numerous specific details are set forth to provide a full understanding of the present disclosure. It will be apparent, however, to one ordinarily skilled in the art that the embodiments of the present disclosure may be practiced without some of these specific details. In other instances, well-known structures and techniques have not been shown in detail so as not to obscure the disclosure.

The disclosed mobile web browser allows a user to manually increase the amount of each tab being displayed in a tab stack. On a touchscreen device, the user selects any two tabs in a tab stack by placing one finger on each tab. The user then drags the user's two fingers either closer together to decrease the space between the two selected tabs and any tabs in-between, thereby decreasing the amount of each tab being displayed, or drags the user's two fingers farther apart to increase the space between the two selected tabs and any tabs in-between, thereby increasing the amount of each tab being displayed. The tabs in-between the two selected tabs move proportionately with the two selected tabs being moved. If the user is viewing the mobile web browser in the mobile device's portrait mode, the user drags the user's two fingers along a y-axis, and if the user is viewing the mobile web browser in the mobile device's landscape mode, the user drags the user's two fingers along an x-axis. In certain aspects, the user can drag the user's two fingers in any direction (and not just along an axis) in order to create appropriate spacing for the tabs.

Figure 1:
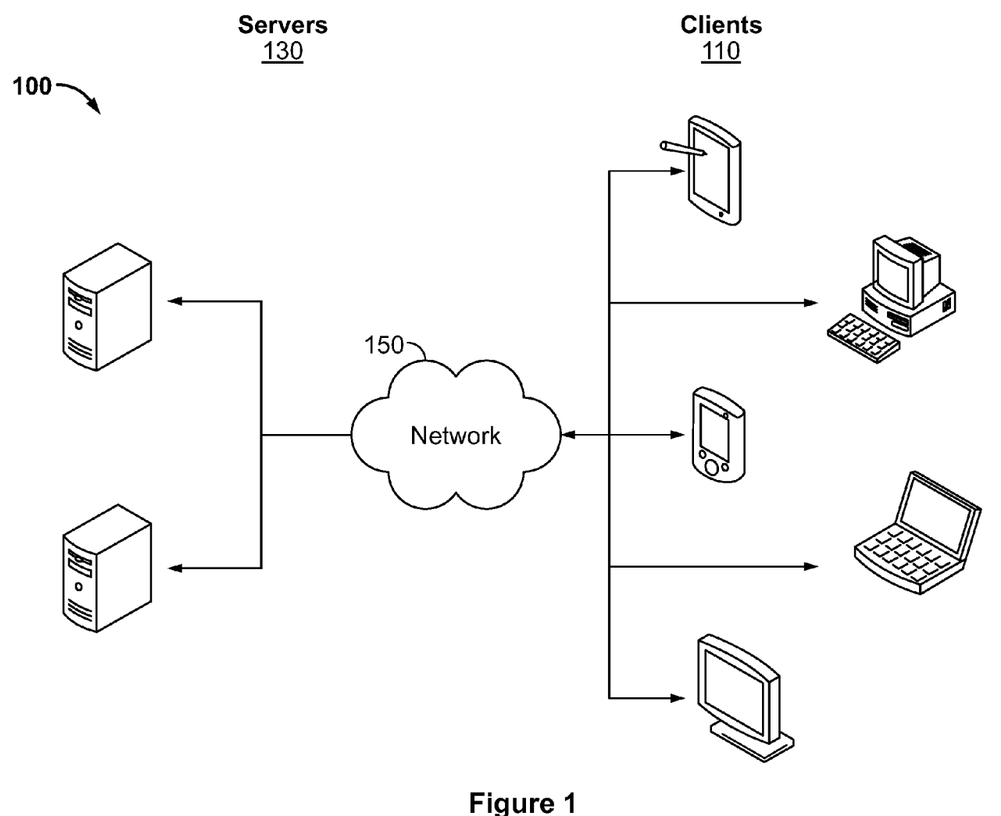
FIG. 1 illustrates an exemplary architecture for adjusting a display of multiple web page windows oriented in an overlaid configuration in a web browser.

Turning to the drawings, FIG. 1 illustrates an exemplary architecture 100 for adjusting a display of multiple web page windows oriented in an overlaid configuration in a web browser. The architecture 100 includes servers 130 and clients 110 connected over a network 150.

Each of the clients 110 is configured to download, install, and run a web browser as disclosed herein. The web browser is configured to run on clients 110 that are mobile or non-mobile. The clients 110 can be, for example, desktop computers, laptop computers, mobile devices (e.g., a smartphone, tablet computer, or PDA), set top boxes (e.g., for a television), video game consoles, or any other devices having appropriate processor, memory, and communications capabilities. In certain aspects, certain advantages of the web browser, such as less effort made by the user to adjust tab views, are more salient on clients 110 that are mobile devices (e.g., tablet computers or smartphones) or that otherwise have limited display areas.

The web browser, once installed on a client 110, is configured to load web pages from any one or multiple servers 130 hosting the web pages. The servers 130 can be any device having an appropriate processor, memory, and communications capability for hosting the data for installing the web browser and for hosting the web pages. The network 150 can include, for example, any one or more of a personal area network (PAN), a local area network (LAN), a campus area network (CAN), a metropolitan area network (MAN), a wide area network (WAN), a broadband network (BBN), the Internet, and the like. Further, the network 150 can include, but is not limited to, any one or more of the following network topologies, including a bus network, a star network, a ring network, a mesh network, a star-bus network, tree or hierarchical network, and the like.

The disclosed web browser, once downloaded from a server 130 and installed and executed on a client 110, is configured to display tabs (e.g., individual web page windows) for opened web pages in a stacked orientation, and adjust the view of the tabs using a two touch input dragging motion, with each touch inputs for a respective tab. When each touch input is brought closer together, the respective tabs, and any tabs in-between the respective tabs in the stack, are brought closer together, thereby decreasing the amount of each tab that is displayed on the screen (except for possibly the tab near the bottom of the screen). When each touch input is taken farther apart, the respective tabs, and any tabs in-between the respective tabs in the stack, are moved farther apart, thereby increasing the amount of each tab that is displayed on the screen (except for possibly the tab near the bottom of the screen). Although two touch inputs are described, more than two touch inputs can be used, with one touch input for each tab being moved/dragged.

Figure 2:
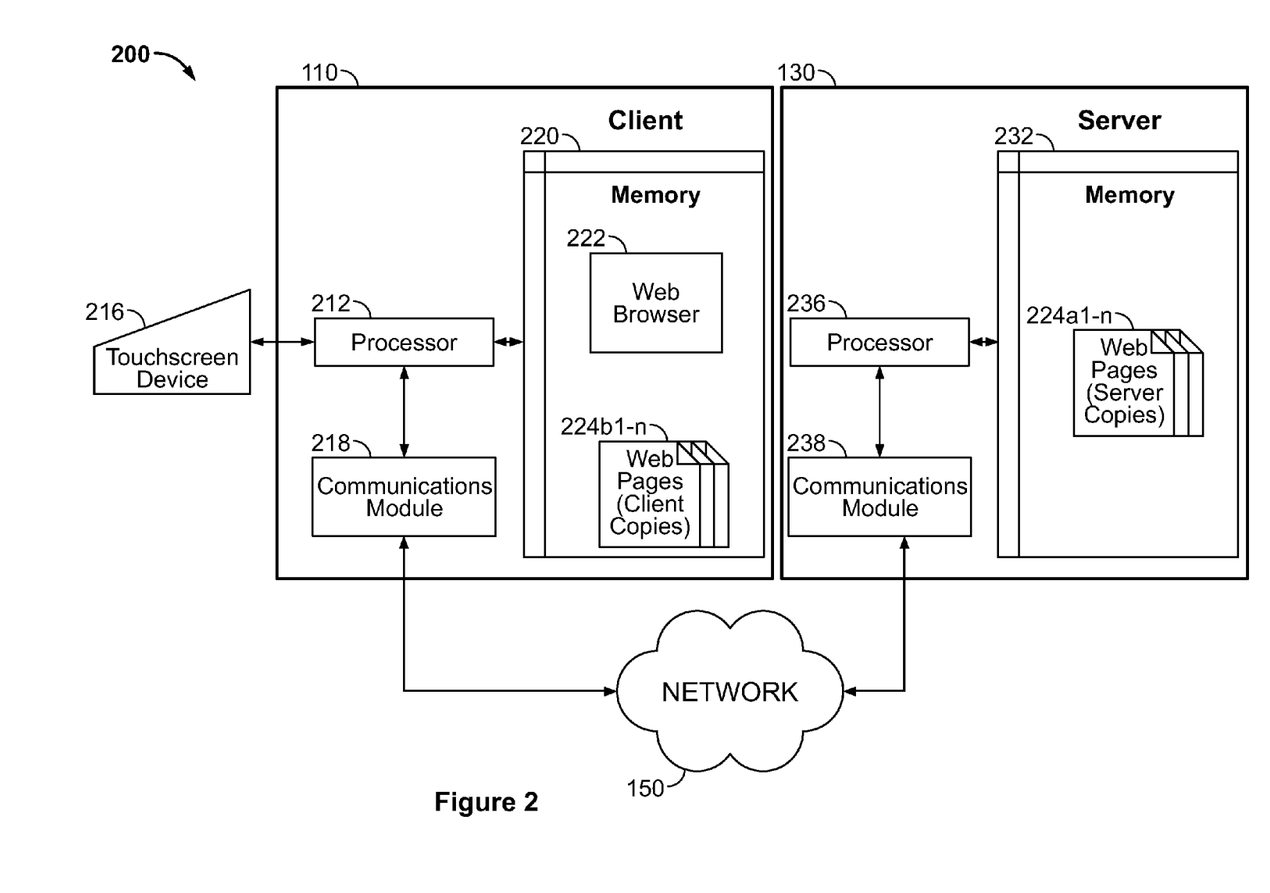
FIG. 2 is a block diagram illustrating an exemplary client and server from the architecture of FIG. 1 according to certain aspects of the disclosure.

FIG. 2 is a block diagram 200 illustrating an exemplary server 130 and client 110 in the architecture 100 of FIG. 1 according to certain aspects of the disclosure. The client 110 and the server 130 are connected over the network 150 via respective communications modules 218 and 238. The communications modules 218 and 238 are configured to interface with the network 150 to send and receive information, such as data, requests, responses, and commands to other devices on the network. The communications modules 218 and 238 can be, for example, modems or Ethernet cards.

The client 110 includes a processor 212, the communications module 218, and a memory 220. The memory 220 includes a web browser 222 and a client copies of n web pages 224$b$1 to 224$bn$ to display in a stack of tabs in the web browser 222 using the output device 214 (e.g., a display) of the client 110. The client 110 also includes a combined input/output device 216, such as a touchscreen device 216. Alternatively, the client 110 can include a separate input device, such as a keyboard, touchscreen, or mouse, and an output device. The client copies of the web pages 224$b$1-$n$ are obtained over the network 150 from the processor 236 of the server 130 using server copies of the web pages 224$a$1-$n$ stored in the memory 232 of the server 130. Although the server copies of the web pages 224$a$1-$n$ are illustrated as being stored on one server 130, they can also be stored on many different servers.

The processor 212 of the client 110 is configured to execute instructions, such as instructions physically coded into the processor 212, instructions received from software in memory 240, or a combination of both. For example, the processor 212 of the client 110 executes instructions from the web browser 222 to receive a request to display a first web page 224$b$1 in a first tab (e.g., web page window) and a request to display a second web page 224$b$2 in a second tab, and provide a display of the first and second tabs oriented in an overlaid configuration, wherein a portion of each of the first and second tabs is visible. The overlaid configuration can be a stack of tabs, where any new tab that is generated is added to the stack. The processor 212 is also configured to execute instructions to receive a selection of the visible portion of the first tab in the overlaid configuration with a first touch input, and a selection of the visible portion of the second tab in the overlaid configuration with a second touch input. A visible portion of a tab can be selected by selecting a tab indicator (e.g., a tab-shaped indicator attached to a portion of the web page window that does not display the web page).

The processor 212 is also configured to execute instructions to receive a dragging motion of the first touch input and the second touch input to alter the visible portions of the first and second tabs in the overlaid configuration. In certain aspects, movement of the first and second web page windows tabs can be limited to a single axis. For example, the tabs can be limited to moving along a vertical (or y-) axis when the touchscreen device 216 is in a portrait orientation and the tabs can be limited to moving along a horizontal (or x-) axis when the touchscreen device 216 is in a landscape orientation. The selected visible portions of the tabs can remain visible after the dragging motion is received. In other words, the portion of each of the tabs that is selected by the touch input remains visible after the tabs have been released from movement. In certain aspects, movement of the first and second web page windows tabs is not limited to an axis. For example, one tab can be moved up and to the left in response to a user dragging one finger selecting the tab up and to the left, and another tab can be moved down and to the left in response to the user dragging another finger selecting the other tab down and to the left.

The processor 212 is configured to increase the visible portion of the first tab and decrease the visible portion of the second tab in the overlaid configuration when the dragging motion includes dragging the first touch input and the second touch input away from one another. The processor 212 is configured to decrease the visible portion of the first tab and increase the visible portion of the second tab in the overlaid configuration when the dragging motion includes dragging the first touch input and the second touch input towards one another. The increase and decrease in the amount of the visible portions of the tabs can be proportional to the length of the dragging motion. For example, if there are 4 tabs in a stack, and the topmost and bottommost tabs are dragged towards one another, then, with the exception of the tab towards the bottom of the display (which is dragged onto the display thereby increasing its displayable portion), the visible portion of each of the remaining tabs decreases by the same amount (e.g., about 33%). Similarly, if there are 8 tabs in a stack, and the topmost and bottommost tabs are dragged away from one another, then, with the exception of the tab towards the bottom of the display (which is dragged off of the display thereby decreasing its displayable portion), the visible portion of each of the remaining tabs increases by the same amount (e.g., about 14%).

The processor 212 is also configured to increase or decrease the visible portions of at least one of the two tabs in the overlaid configuration when the dragging motion includes dragging one of the two touch inputs in a first direction and maintaining the second touch input in a substantially stationary position.

Figure 3:
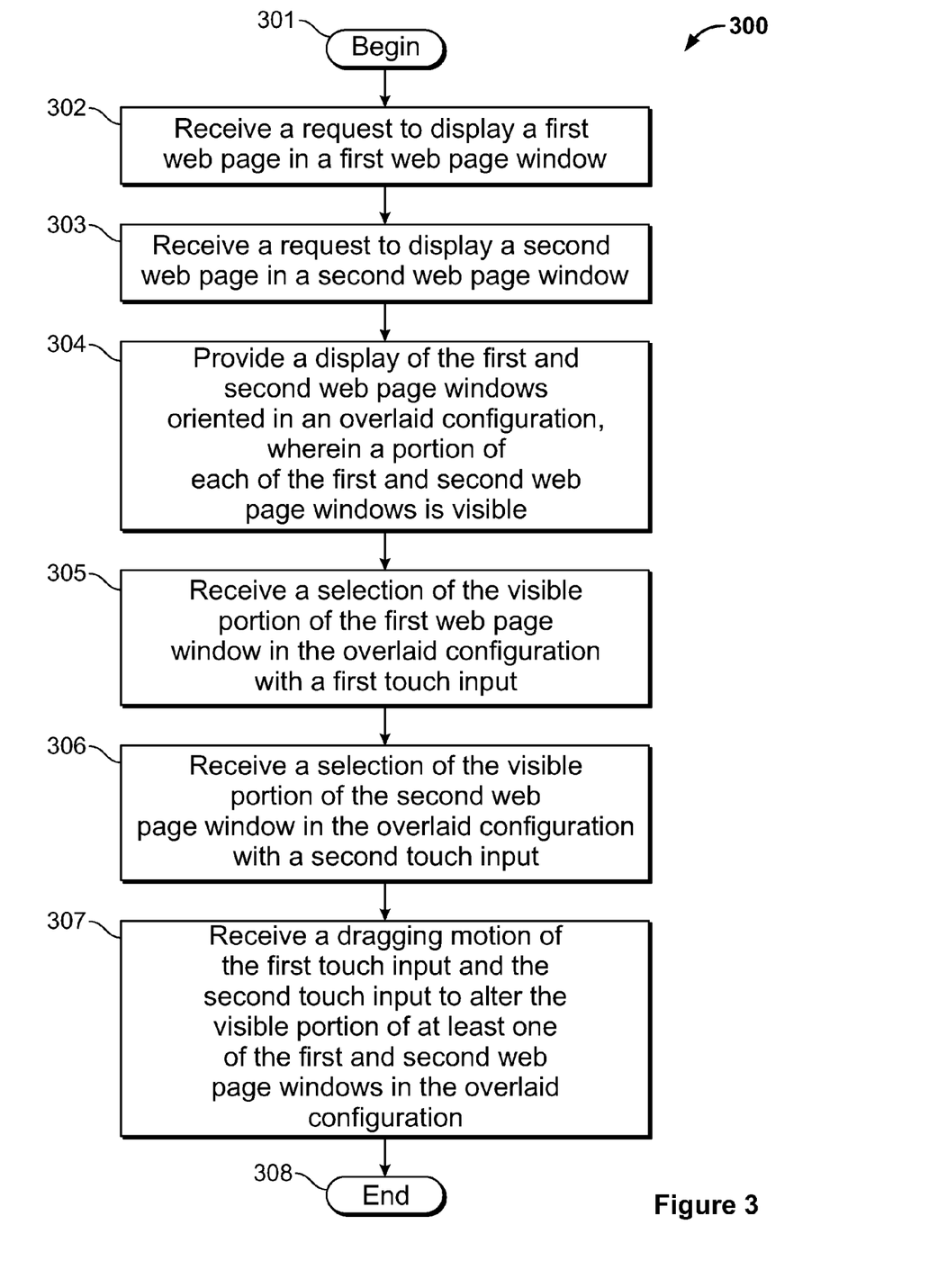
FIG. 3 illustrates an exemplary process for adjusting a display of multiple web page windows oriented in an overlaid configuration in a web browser using an exemplary client of FIG. 2.

FIG. 3 illustrates an exemplary process 300 for adjusting a display of multiple web page windows oriented in an overlaid configuration in a web browser 222 using the exemplary client 110 of FIG. 2. The process 300 begins by proceeding from begin step 301 when a web browser 222 is loaded on the client 110 to steps 302 and 303 when requests to display a first web page in a first tab and a second web page in a second tab are received, respectively. In step 304, a display of the first and second tabs oriented in an overlaid configuration is provided, wherein a portion of each of the first and second tabs is visible. In step 305, a selection of the visible portion of the first tab in the overlaid configuration is received with a first touch input, and in step 306, a selection of the visible portion of the second tab in the overlaid configuration with a second touch input is received. In step 307, a dragging motion of the first touch input and the second touch input to alter the visible portion of at least one of the first and second web page windows in the overlaid configuration is received, and the process 300 ends.

Figure 4A:
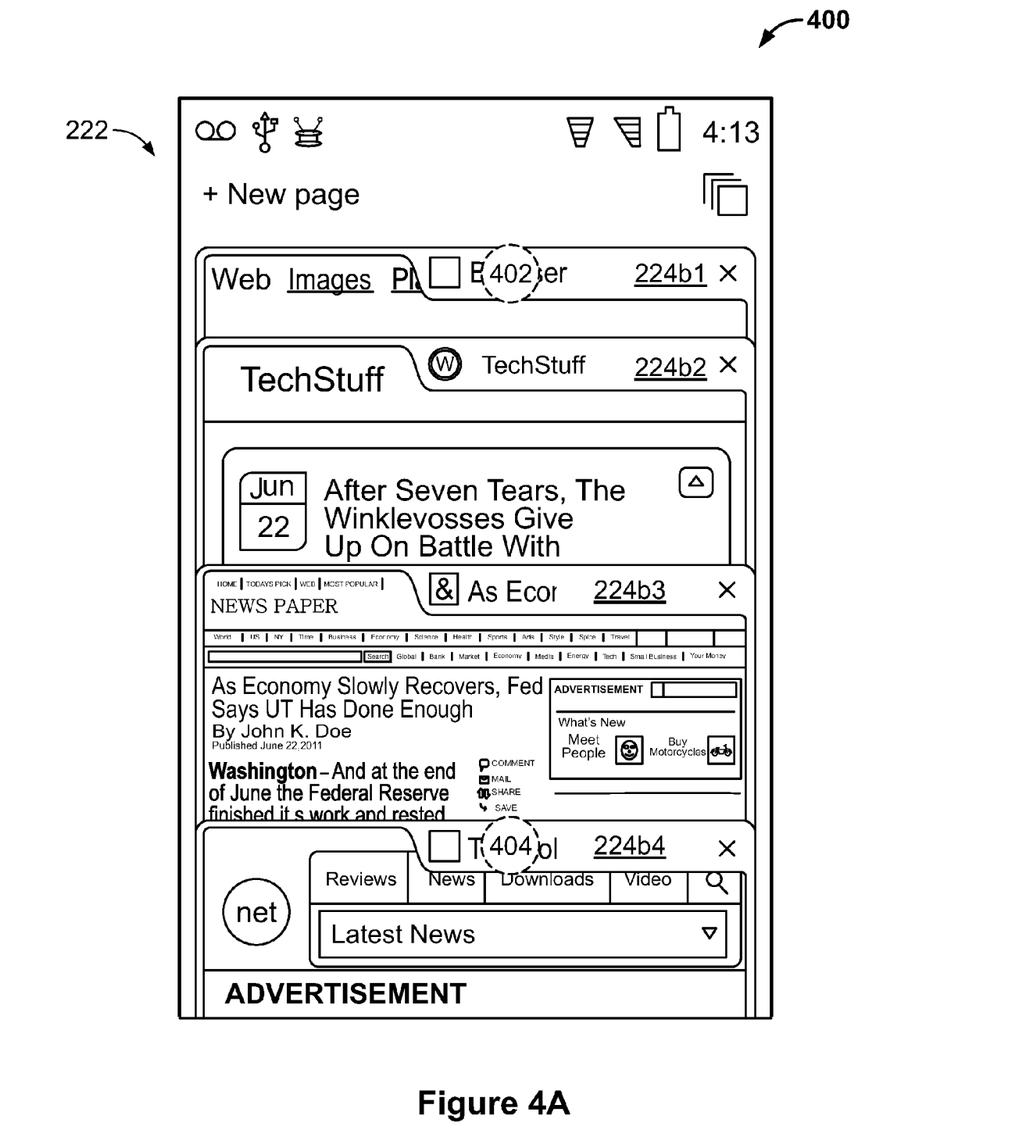
FIGS. 4A-4C are exemplary screenshots associated with the exemplary process of FIG. 3.

An example will now be described using the exemplary process 300 of FIG. 3, a mobile web browser 222 on a smartphone client 110. The process 300 begins by proceeding from begin step 301 when a user loads a mobile web browser 222 on the user's smartphone 110 to steps 302 and 303 when the user requests to display a first web page in a first tab (e.g., a first web page browsing window) and a second web page in a second tab, respectively. In step 304, the mobile web browser 222 provides a display of the first and second tabs oriented in an overlaid configuration, wherein a portion of each of the first and second tabs is visible. FIG. 4A illustrates an exemplary screenshot of the first tab 224b1, second tab 224b4, a third tab 224b2, and a fourth tab 224b3 displayed in a display interface of the mobile web browser 222. The tabs 224b1 to 224b4 are displayed by a stacking interface in an overlaid, stacked configuration.

Figure 4B:
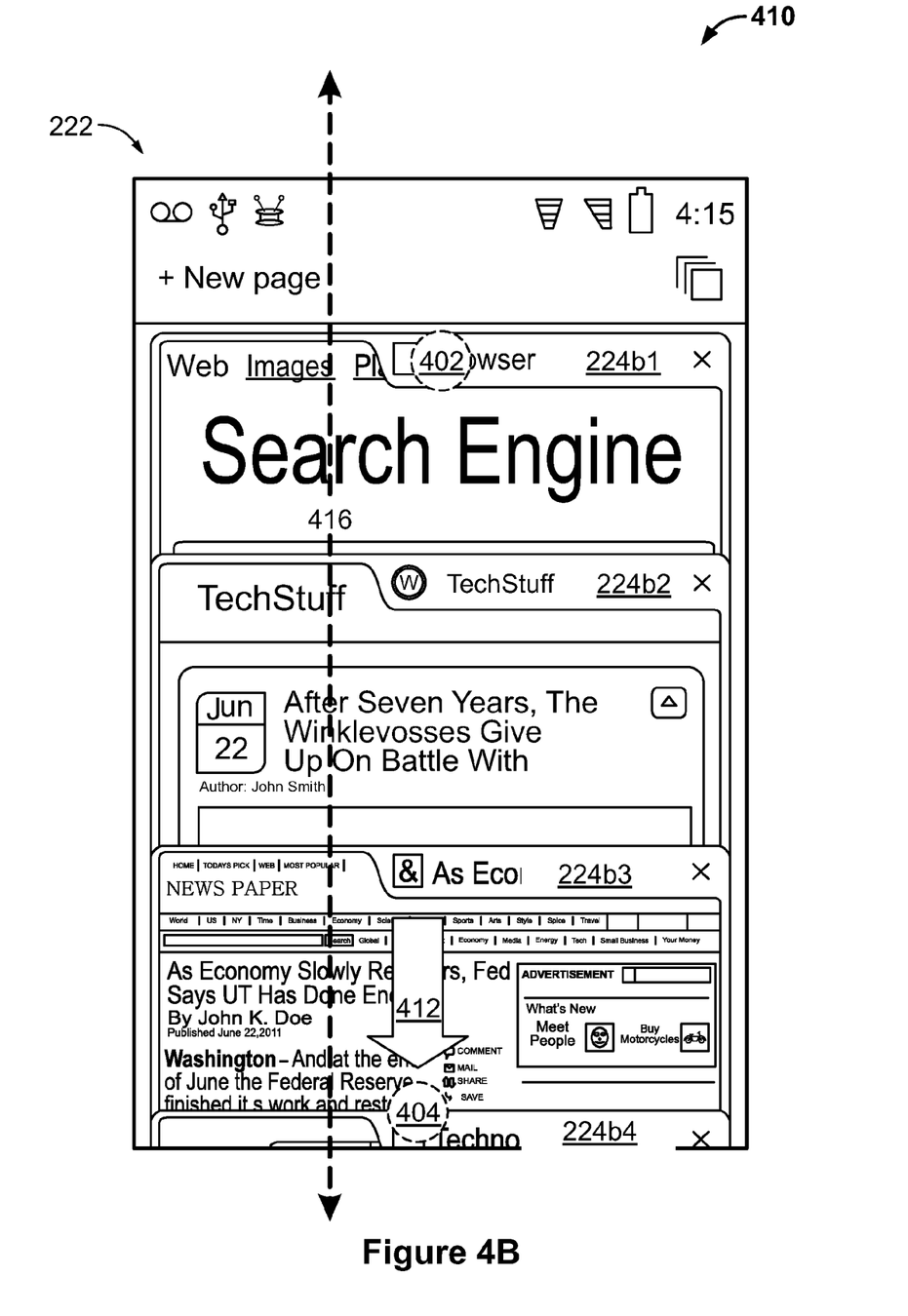
Figure 4C:
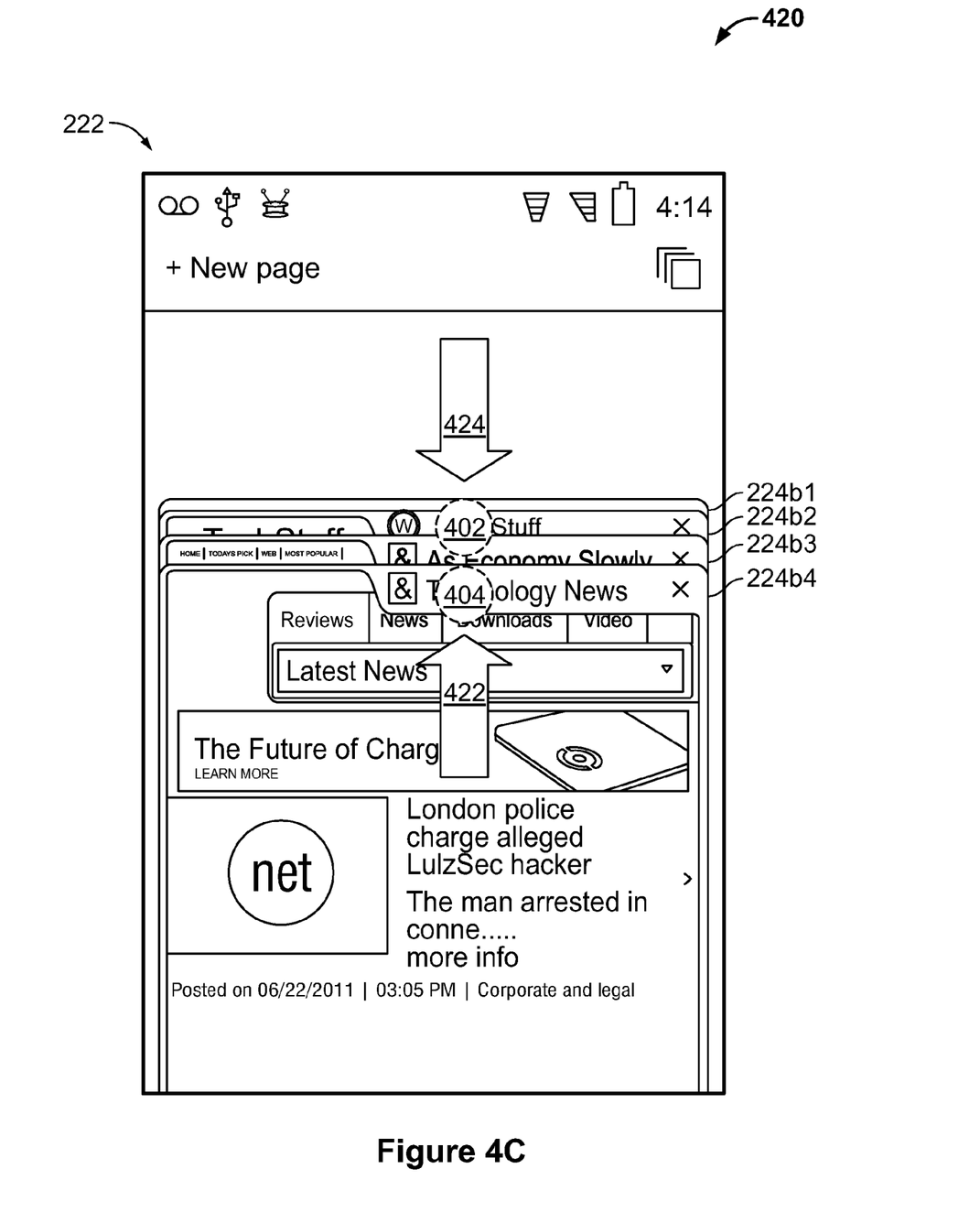

In step 305, the user touch selects a tab indicator of the first tab 224b1 in the stack by using a finger to provide a first touch input 402, and in step 306, the user touch selects the visible portion of the second tab 224b4 in the stack by using another finger to provide a second touch input 404. As illustrated in FIG. 4B, another exemplary screenshot 410 of the mobile web browser 222, in step 307, the user drags the user's other finger (e.g., second touch input 404) along a vertical axis 416 in a direction 412 away from the user's first finger's (e.g., first touch input 402), which remains in substantially the same position. As a result, the visible portions of the tabs 224b1 to 224b3 are increased, while the visible portion of tab 224b4 decreases because it is moved in a direction off of the display. As illustrated in FIG. 4C, yet another exemplary screenshot 420 of the mobile web browser 222, the user drags the first touch input 402 and the second touch input 404 along a vertical axis 416 in directions 424 and 422 towards one another, and the visible portions of the tabs 224b1 to 224b3 are decreased, while the visible portion of bottommost tab 224b4 increase because it is moved in a direction back on to the display. The process 300 ends.

Figure 5:
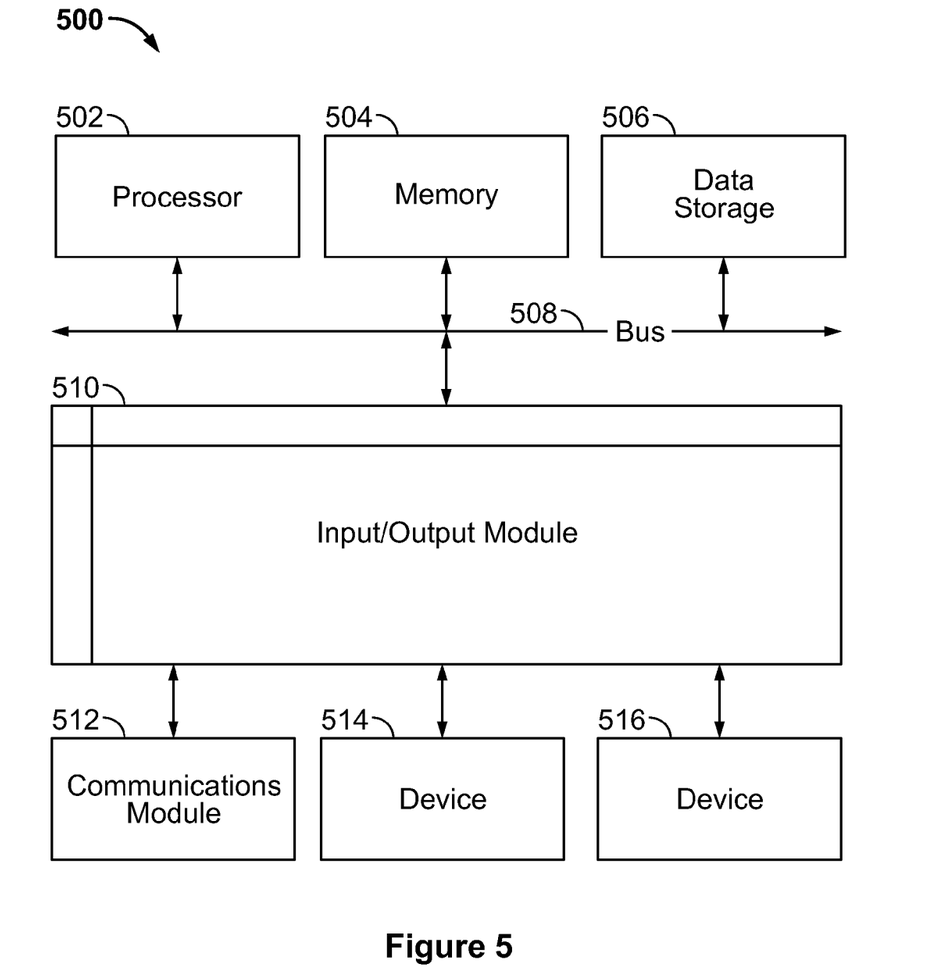
FIG. 5 is a block diagram illustrating an exemplary computer system with which the client and server of FIG. 2 can be implemented.

FIG. 5 is a block diagram illustrating an exemplary computer system 500 with which the client 110 and server 130 of FIG. 2 can be implemented. In certain aspects, the computer system 500 may be implemented using hardware or a combination of software and hardware, either in a dedicated server, or integrated into another entity, or distributed across multiple entities.

Computer system 500 (e.g., client 110 and server 130) includes a bus 508 or other communication mechanism for communicating information, and a processor 502 (e.g., processor 212 and 236) coupled with bus 508 for processing information. By way of example, the computer system 500 may be implemented with one or more processors 502. Processor 502 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 500 can include, in addition to hardware, code that creates an execution environment for the computer program in question, e.g., code that constitutes processor firmware, a protocol stack, a database management system, an operating system, or a combination of one or more of them stored in an included memory 504 (e.g., memory 220 and 232), such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 508 for storing information and instructions to be executed by processor 502. The processor 502 and the memory 504 can be supplemented by, or incorporated in, special purpose logic circuitry.

The instructions may be stored in the memory 504 and implemented in one or more computer program products, i.e., one or more modules of computer program instructions encoded on a computer readable medium for execution by, or to control the operation of, the computer system 500, and according to any method well known to those of skill in the art, including, but not limited to, computer languages such as data-oriented languages (e.g., SQL, dBase), system languages (e.g., C, Objective-C, C++, Assembly), architectural languages (e.g., Java, .NET), and application languages (e.g., PHP, Ruby, Perl, Python). Instructions may also be implemented in computer languages such as array languages, aspect-oriented languages, assembly languages, authoring languages, command line interface languages, compiled languages, concurrent languages, curly-bracket languages, dataflow languages, data-structured languages, declarative languages, esoteric languages, extension languages, fourth-generation languages, functional languages, interactive mode languages, interpreted languages, iterative languages, list-based languages, little languages, logic-based languages, machine languages, macro languages, metaprogramming languages, multiparadigm languages, numerical analysis, non-English-based languages, object-oriented class-based languages, object-oriented prototype-based languages, off-side rule languages, procedural languages, reflective languages, rule-based languages, scripting languages, stack-based languages, synchronous languages, syntax handling languages, visual languages, wirth languages, and xml-based languages. Memory 504 may also be used for storing temporary variable or other intermediate information during execution of instructions to be executed by processor 502.

A computer program as discussed herein does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network. The processes and logic flows described in this specification can be performed by one or more programmable processors executing one or more computer programs to perform functions by operating on input data and generating output.

Computer system 500 further includes a data storage device 506 such as a magnetic disk or optical disk, coupled to bus 508 for storing information and instructions. Computer system 500 may be coupled via input/output module 510 to various devices. The input/output module 510 can be any input/output module. Exemplary input/output modules 510 include data ports such as USB ports. The input/output module 510 is configured to connect to a communications module 512. Exemplary communications modules 512 (e.g., communications modules 218 and 238) include networking interface cards, such as Ethernet cards and modems. In certain aspects, the input/output module 510 is configured to connect to a plurality of devices, such as an input device 514 (e.g., input device 216) and/or an output device 516 (e.g., output device 214). Exemplary input devices 514 include a keyboard and a pointing device, e.g., a mouse or a trackball, by which a user can provide input to the computer system 500. Other kinds of input devices 514 can be used to provide for interaction with a user as well, such as a tactile input device, visual input device, audio input device, or brain-computer interface device. For example, feedback provided to the user can be any form of sensory feedback, e.g., visual feedback, auditory feedback, or tactile feedback; and input from the user can be received in any form, including acoustic, speech, tactile, or brain wave input. Exemplary output devices 516 include display devices, such as a CRT (cathode ray tube) or LCD (liquid crystal display) monitor, for displaying information to the user.

According to one aspect of the present disclosure, the client 110 and server 130 can be implemented using a computer system 500 in response to processor 502 executing one or more sequences of one or more instructions contained in memory 504. Such instructions may be read into memory 504 from another machine-readable medium, such as data storage device 506. Execution of the sequences of instructions contained in main memory 504 causes processor 502 to perform the process steps described herein. One or more processors in a multi-processing arrangement may also be employed to execute the sequences of instructions contained in memory 504. In alternative aspects, hard-wired circuitry may be used in place of or in combination with software instructions to implement various aspects of the present disclosure. Thus, aspects of the present disclosure are not limited to any specific combination of hardware circuitry and software.

Various aspects of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. The communication network (e.g., network 150) can include, for example, any one or more of a personal area network (PAN), a local area network (LAN), a campus area network (CAN), a metropolitan area network (MAN), a wide area network (WAN), a broadband network (BBN), the Internet, and the like. Further, the communication network can include, but is not limited to, for example, any one or more of the following network topologies, including a bus network, a star network, a ring network, a mesh network, a star-bus network, tree or hierarchical network, or the like. The communications modules can be, for example, modems or Ethernet cards.

Computing system 500 can include clients and servers. A client and server are generally remote from each other and typically interact through a communication network. The relationship of client and server arises by virtue of computer programs running on the respective computers and having a client-server relationship to each other. Computer system 500 can be, for example, and without limitation, a desktop computer, laptop computer, or tablet computer. Computer system 500 can also be embedded in another device, for example, and without limitation, a mobile telephone, a personal digital assistant (PDA), a mobile audio player, a Global Positioning System (GPS) receiver, a video game console, and/or a television set top box.

The term "machine-readable storage medium" or "computer readable medium" as used herein refers to any medium or media that participates in providing instructions to processor 502 for execution. Such a medium may take many forms, including, but not limited to, non-volatile media, volatile media, and transmission media. Non-volatile media include, for example, optical or magnetic disks, such as data storage device 506. Volatile media include dynamic memory, such as memory 504. Transmission media include coaxial cables, copper wire, and fiber optics, including the wires that comprise bus 508. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, or any other medium from which a computer can read. The machine-readable storage medium can be a machine-readable storage device, a machine-readable storage substrate, a memory device, a composition of matter effecting a machine-readable propagated signal, or a combination of one or more of them.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the aspects described above should not be understood as requiring such separation in all aspects, and it should be understood that the described program components and systems can generally be integrated together in a single software product or packaged into multiple software products.

The subject matter of this specification has been described in terms of particular aspects, but other aspects can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

These and other implementations are within the scope of the following claims.

What is claimed is:

1. A computer-implemented method for adjusting a display of multiple web page windows oriented in an overlaid configuration in a web browser, the method comprising:
    providing for display a plurality of web page windows as a stack of web page windows in an overlaid configuration, the plurality of web page windows comprising a first web page window, a second web page window, and a third web page window between the first web page window and the second web page window, the first web page window being detached from and not bound to the second web page window in the overlaid configuration;
    receiving a selection of a visible portion of the first web page window with a first touch input and a selection of a visible portion of the second web page window with a second touch input; and
    receiving a dragging motion of the first touch input and the second touch input to alter the visible portion of at least one of the first and second web page windows in the overlaid configuration,
    wherein when the dragging motion comprises concurrent dragging of the first touch input and the second touch input away from one another, the visible portion of the first web page window and the visible portion of the third web page window is increased and the visible portion of the second web page window is decreased based on the concurrent movement of each of the first web page window in response to the dragging of the first touch input and the second web page window in response to the dragging of the second touch input,
    wherein when the dragging motion comprises concurrent dragging of the first touch input and the second touch input towards one another, the visible portion of the first web page window and the visible portion of the third web page window is decreased and the visible portion of the second web page window is increased based on the concurrent movement of each of the first web page window in response to the dragging of the first touch input and the second web page window in response to the dragging of the second touch input, and
    wherein an order of the third web page window between the first web page window and the second web page window remains unchanged upon the concurrent selection of the visible portion of the first web page window and the visible portion of the second web page window.

2. The computer-implemented method of claim 1, wherein the increase and decrease in the amount of the visible portions of the first and second web page windows is proportional to the length of the dragging motion.

3. The computer-implemented method of claim 1, wherein the second web page window is overlaid above the first web page window.

4. The computer-implemented method of claim 1, wherein movement of the first and second web page windows is limited to a single axis.

5. The computer-implemented method of claim 1, wherein receiving the selection of the visible portion of the first web page window or the second web page window comprises receiving a selection of a tab indicator of the first web page window or a tab indicator of the second web page window.

6. The computer-implemented method of claim 1, wherein the selected visible portion of the first web page window and the selected visible portion of the second web page window remain visible after the dragging motion is received.

7. A system for adjusting a display of multiple web page windows oriented in an overlaid configuration in a web browser, the system comprising:
    a memory comprising a first web page and a second web page;
    a processor configured to execute instructions to:
    provide for display a plurality of web page windows as a stack of web page windows in an overlaid configuration, the plurality of web page windows comprising a first web page window, a second web page window, and a third web page window between the first web page window and the second web page window, the first web page window being detached from and not bound to the second web page window in the overlaid configuration;
    receive a selection of a visible portion of the first web page window displaying the first web page with a first touch input; and a selection of a visible portion of the second web page window with a second touch input; and receive a dragging motion of the first touch input and the second touch input to alter the visible portion of at least one of the first and second web page windows in the overlaid configuration, wherein when the dragging motion comprises concurrent dragging of the first touch input and the second touch input away from one another, the visible portion of the first web page window and the visible portion of the third web page window is increased and the visible portion of the second web page window is decreased based on the concurrent movement of each of the first web page window in response to the dragging of the first touch input and the second web page window in response to the dragging of the second touch input, wherein when the dragging motion comprises concurrent dragging of the first touch input and the second touch input towards one another, the visible portion of the first web page window and the visible portion of the third web page window is decreased and the visible portion of the second web page window is increased based on the concurrent movement of each of the first web page window in response to the dragging of the first touch input and the second web page window in response to the dragging of the second touch input, and wherein an order of the third web page window between the first web page window and the second web page window remains unchanged upon the concurrent selection of the visible portion of the first web page window and the visible portion of the second web page window.

8. The system of claim 7, wherein the increase and decrease in the amount of the visible portions of the first and second web page windows is proportional to the length of the dragging motion.

9. The system of claim 7, wherein the second web page window is overlaid above the first web page window.

10. The system of claim 7, wherein the processor is configured to limit movement of the first and second web page windows to a single axis.

11. The system of claim 7, wherein the processor being configured to execute instructions to receive the selection of the visible portion of the first web page window or the second web page window comprises the processor being configured to execute instructions to receive a selection of a tab indicator of the first web page window or a tab indicator of the second web page window.

12. The system of claim 7, wherein the selected visible portion of the first web page window and the selected visible portion of the second web page window remain visible after the dragging motion is received.

13. A mobile web browser for adjusting a display of multiple web page windows oriented in an overlaid configuration in a web browser, the mobile web browser comprising:

a stacking interface configured to provide, using a processor, a display of a plurality of web page windows as a stack of web page windows in an overlaid configuration, the plurality of web page windows comprising a first web page window, a second web page window, and a third web page window between the first web page window and the second web page window, the first web page window being detached from and not bound to the second web page window in the overlaid configuration, wherein a portion of each of the first and second web page windows is visible, and to receive a selection of the visible portion of the first web page window in the overlaid configuration with a first touch input and a selection of the visible portion of the second web page window in the overlaid configuration with a second touch input, wherein, when a concurrent dragging motion of the first touch input and the second touch input is received:

the visible portion of the first web page window and the visible portion of the third web page window is increased and the visible portion of the second web page window is decreased when the dragging motion comprises concurrent dragging of the first touch input and the second touch input away from one another based on the concurrent movement of each of the first web page window in response to the dragging of the first touch input and the second web page window in response to the dragging of the second touch input, and the visible portion of the first web page window and the visible portion of the third web page window is decreased and the visible portion of the second web page window is increased when the dragging motion comprises concurrent dragging of the first touch input and the second touch input towards one another based on the concurrent movement of each of the first web page window in response to the dragging of the first touch input and the second web page window in response to the dragging of the second touch input, and wherein an order of the third web page window between the first web page window and the second web page window remains unchanged upon the concurrent selection of the visible portion of the first web page window and the visible portion of the second web page window.

14. A non-transitory machine-readable storage medium comprising machine-readable instructions for causing a processor to execute a method for adjusting a display of multiple web page windows oriented in an overlaid configuration in a web browser, the method comprising:

providing for display a plurality of web page windows in a stack configuration, the plurality of web page windows comprising a first web page window, a second web page window, and a third web page window between the first web page window and the second web page window, the first web page window being detached from and not bound to the second web page window in the stack configuration;

receiving a selection of a visible portion of the first web page window with a first touch input and a selection of a visible portion of the second web page window with a second touch input; and receiving a dragging motion of the first touch input and the second touch input to alter the visible portion of at least one of the first and second web page windows in the stack configuration, wherein when the dragging motion comprises concurrent dragging the first touch input and the second touch input away from one another along an axis, the visible portion of the first web page window and the visible portion of the third web page window is increased and the visible portion of the second web page window is decreased based on the concurrent movement of each of the first web page window in response to the dragging of the first touch input and the second web page window in response to the dragging of the second touch input, wherein when the dragging motion comprises concurrent dragging of the first touch input and the second touch input towards one another along the axis, the visible portion of the first web page window and the visible portion of the third web page window is decreased and the visible portion of the second web page window is increased based on the concurrent movement of each of the first web page window in response to the dragging of the first touch input and the second web page window in response to the dragging of the second touch input, and wherein an order of the third web page window between the first web page window and the second web page window remains unchanged upon the concurrent selection of the visible portion of the first web page window and the visible portion of the second web page window.

* * * * *